United States Patent
Demeester

[11] Patent Number: 5,885,714
[45] Date of Patent: Mar. 23, 1999

[54] LAMINATED SAFETY GLASS

[75] Inventor: Jean-Jacques Demeester, Sully Sur Loire, France

[73] Assignee: Saint-Gobain Vitrage, Courbevoie, France

[21] Appl. No.: 445,109

[22] Filed: May 19, 1995

[30] Foreign Application Priority Data

May 19, 1994 [FR] France .................................. 94 06134

[51] Int. Cl.$^6$ .................................................. B32B 17/10
[52] U.S. Cl. .......................... 428/441; 428/192; 428/416; 428/417
[58] Field of Search ............................ 428/34, 192, 415, 428/416, 417, 418, 426, 436, 437, 441, 446, 425.6; 296/84.1; 52/509, 54

[56] References Cited

U.S. PATENT DOCUMENTS

| | | | |
|---|---|---|---|
| 2,310,402 | 2/1943 | Dennison | 20/56.5 |
| 2,374,056 | 4/1945 | Watkins | 154/2.71 |
| 2,991,207 | 7/1961 | Miller | 428/81 |
| 3,424,642 | 1/1969 | Orcutt | 161/45 |
| 4,046,933 | 9/1977 | Stefanik | 428/81 |
| 4,799,346 | 1/1989 | Bolton | 52/509 |
| 5,139,850 | 8/1992 | Clarke et al. | 428/34 |

FOREIGN PATENT DOCUMENTS 2612174  9/1988  France .

Primary Examiner—Donald Loney
Attorney, Agent, or Firm—Oblon, Spivak, McClelland, Maier & Neustadt, P.C.

[57] ABSTRACT

A window for an airplane pressurized cockpit having a window opening and a rabbet defining a periphery of the window opening includes first and second sheets of glass, and a separating layer positioned between the first and second sheets of glass and connecting the first and second sheets of glass. The separating layer has a periphery which does not extend substantially beyond peripheries of the first and second sheets of glass. A rigid belt is embedded in the separating layer adjacent the periphery of the separating layer for rigidifying the periphery of said separating layer. The rigid belt ensures that the separating layer is held in place in case of rupture of the glass sheets.

10 Claims, 1 Drawing Sheet

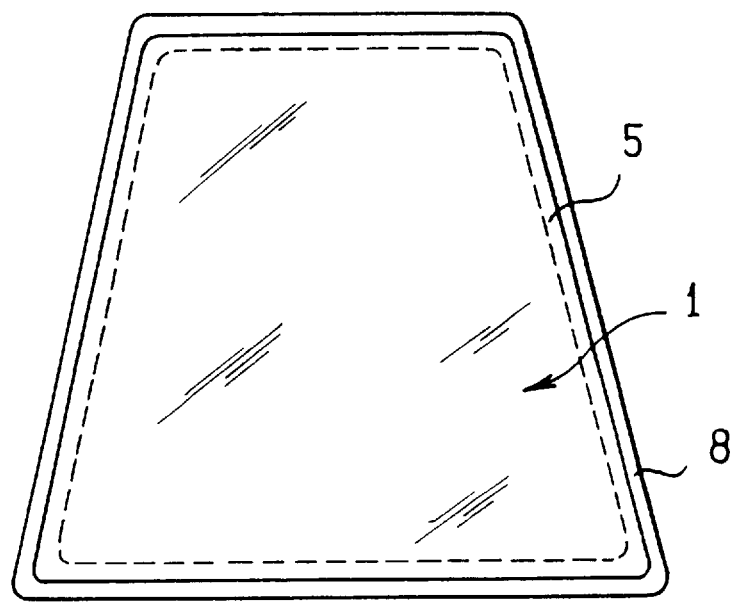
FIG_1
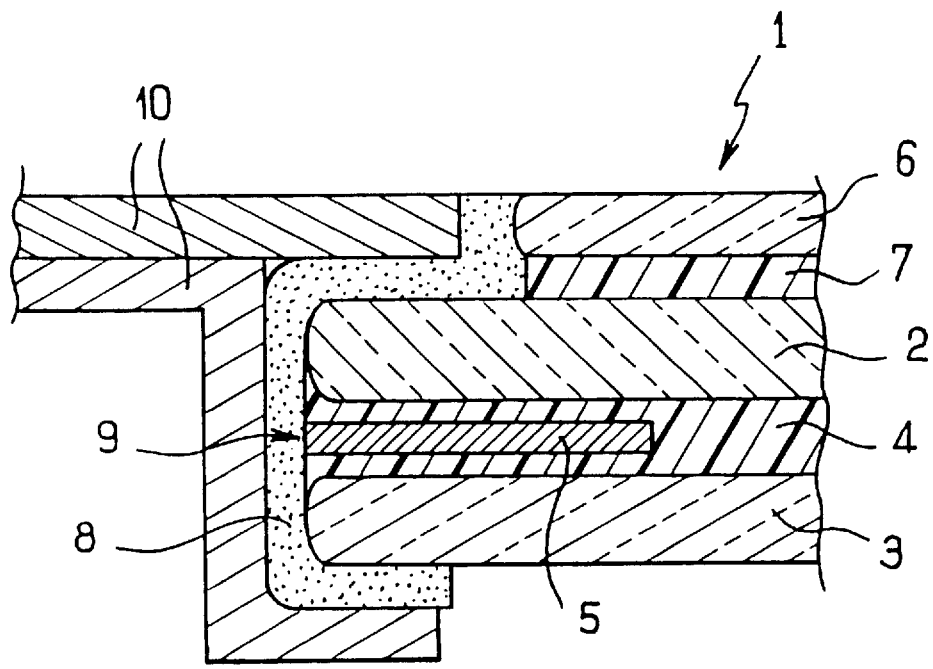
FIG_2

LAMINATED SAFETY GLASS

BACKGROUND OF THE INVENTION

1. Field of the Invention

This invention pertains to laminated safety glass, especially for an airplane pressurized cockpit window, including at least two sheets of glass and a separating layer made of plastic.

2. Description of the Background Art

Laminated glass windows in airplanes, that is to say windows which include at least two sheets of glass and a separation layer made of plastic which is formed by one or several sheets of polyvinylbutyral and/or polyurethane, can be installed by being bolted together in the structure of the cockpit as described, for example, in U.S. Pat. No. 3,616,122, or more simply by being fitted into a rabbet.

In flight these windows are subjected to considerable differential pressure between the inside and outside of the cockpit. This differential pressure must be maintained under all circumstances, particularly in case of a flight incident causing breakage of the window.

Thus, laminated glass windows for airplanes use at least two sheets of glass as structural layers to mitigate the consequences of accidental breakage of a sheet of glass. Each of them must be capable of supporting the maximum differential pressure to which the airplane window might be subjected during flights at high altitude.

Although not likely, a fracture of two sheets of glass which constitute the structural layers is nevertheless possible. When the window is bolted to the structure of the cockpit, it can remain in place even if the sheets of glass break, due to the separating layer which itself is held by the bolts. On the other hand, if the window is installed by being fitted into a rabbet, this might cause exposure of the window base in case of breakage of sheets of glass, which will result in sudden depressurization through the opening that is thereby made.

SUMMARY OF THE INVENTION

It is therefore an object of the invention to provide a laminated glass window which is to be installed by being fitted into a rabbet, that is to say without being held by bolting of the separating layer, but which is capable of resisting the differential pressures to which it is subjected during all conditions of use.

The laminated glass window in accordance with the invention includes first and second sheets of glass, a separating layer positioned between the first and second sheets of glass and connecting the first and second sheets of glass, the separating layer having a periphery which does not extend substantially beyond peripheries of the first and second sheets of glass, and a rigid belt embedded in the separating layer adjacent the periphery of the separating layer for rigidifying the periphery of said separating layer. The rigid belt ensures that the separating layer is held in place in case of rupture of the glass sheets.

When the window is installed by being fitted in its rabbet, the rigid belt and the separating layer which contain it cannot fall out in case the glass sheets break. The flexible separating layer in this case acts as an airtight membrane.

The dimensions of the rigid belt are defined particularly by the pressure which the separating layer must withstand while being held in place in the rabbet in the extreme case in which all the sheets of glass which provide rigidity of the window during normal operation are broken in flight.

The characteristics and dimensions of the belt can vary according to the dimensions of the window. For example, the dimensions of the belt can vary from approximately 5 to 50 mm over its average width and from approximately 1 to 5 mm in thickness. The width of the rigid belt corresponds advantageously to at least the depth of the rabbet which is to receive the window.

The rigid belt can be a metal belt, for example made of stainless steel, aluminum or metal alloy, or in a variant design, of another material which will provide the desired rigidity for the separating layer.

The rigid belt does not go beyond the periphery of the window to any great extent, that is to say beyond the sheets of glass forming the structural layers, except when this is necessary in order to partially overlap the edge of the window. In this case the belt can have an external edge in a T or L-shape, for example.

Of course, the window in accordance with the invention can also include other sheets of glass and plastic material.

The sheets of glass that are connected by the separating layer containing the rigid belt can be sheets of annealed silicate glass or, if preferred, thermally or chemically tempered.

The separating layer containing the rigid belt can be made of several plies of plastified polyvinylbutyral (PVB) and/or polyurethane.

The thickness of the separating layer is obviously greater than the thickness of the rigid belt in order to ensure its glued connection to the glass sheets.

BRIEF DESCRIPTION OF THE DRAWINGS

Other advantages and characteristics of the invention will be apparent from the description of an embodiment of a window in accordance with the invention, given with reference to the figures, in which:

FIG. 1 is a schematic plan view of a window for an airplane cockpit in accordance with the invention; and FIG. 2 is a schematic section view of the window of FIG. 1.

DETAILED DESCRIPTION OF THE PREFERRED EMBODIMENT

FIGS. 1 and 2 show a window for an airplane cockpit, consisting of laminated window 1 whose two structural elements are two sheets of glass 2, 3, each with a thickness of approximately 4 mm to 12 mm, which are connected to one another by a separating layer 4 made of plastified polyvinylbutyral (PVB) with a thickness of approximately 3 mm to 10 mm. This separating layer 4 consists of several plies of PVB and/or polyurethane in the known manner.

A metal belt 5 made of stainless steel is embedded in the peripheral edge of the separating layer 4. The external limit of the belt corresponds to the peripheral limit of the two sheets of glass 2, 3.

Belt 5 has a width of approximately 5 mm to 50 mm, and a thickness of approximately 1 mm to 5 mm, this thickness always being less than the thickness of the separating layer 4. Belt 5 is therefore adhered on each side to the edges of the sheets of glass via the intermediary of that portion of the separating layer which is thicker than the belt. The metal belt which is thus embedded in the periphery of the separating layer ensures undeformability of the periphery of the layer.

The rigidity of the window and its support in the rabbet are essentially ensured by the sheets of glass when the window is intact. If there is accidental breakage of the sheets of glass, the latter can no longer ensure the desired rigidity, and then it is the peripheral belt 5 which causes the separating layer to stay in place in the rabbet 9 formed by sections 10 associated with the cockpit (not shown here).

The window according to the illustrated embodiment also includes a third sheet of glass 6, of an approximate thickness of 2 to 6 mm, generally made of chemically or thermally tempered glass which constitutes the external side of the window with respect to the cockpit. This third sheet of glass 6 is connected to the sheet of structural glass 2 by the intermediary of another separating layer 7 of PVB and/or polyurethane, for example.

The dimensions of the sheet of glass 6 which is oriented toward the outside, as well as those of the separating layer 7, are smaller than the dimensions of the two sheets of glass 2, 3 in order to permit installation in the rabbet.

The window is surrounded by a silicone joint 8 which overlaps the edge of the window and the edges of the sheets of glass 2, 3.

The window in accordance with the invention has been described above in its application as a window for an airplane pressurized cockpit. It can also be used in other applications requiring installation by being fitted into a rabbet and in which it is subjected to considerable differential pressures during use.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. A laminated window comprising:

first and second sheets of glass;

a separating layer positioned between said first and second sheets of glass and connecting said first and second sheets of glass, said separating layer having a periphery which does not extend substantially beyond peripheries of said first and second sheets of glass; and a rigid peripheral belt having a thickness between 1 and 5 mm embedded in said separating layer for rigidifying the periphery of said separating layer.

2. The window according to claim 1, wherein said rigid belt is a metal belt.

3. The window according to claim 1 wherein said rigid belt has a width between 5 and 50 mm.

4. The window according to claim 1 wherein said separating layer is formed of plastic.

5. The window according to claim 2 wherein said rigid belt has a width between 5 and 50 mm.

6. The window according to claim 1 wherein the periphery of said separating layer has substantially the same dimensions as the peripheries of said first and second sheets of glass.

7. A window for an airplane pressurized cockpit having a window opening and a rabbet defining a periphery of the window opening, the window comprising:

first and second sheets of glass having peripheries fitted in the rabbet of the window opening;

a separating layer positioned between said first and second sheets of glass and connecting said first and second sheets of glass, said separating layer having a periphery which does not extend substantially beyond peripheries of said first and second sheets of glass; and a rigid peripheral belt having a thickness between 1 and 5 mm embedded in said separating layer for rigidifying the periphery of said separating layer.

8. The window according to claim 7 wherein said rigid belt is at least partially positioned in said rabbet.

9. The window according to claim 8 including a third sheet of glass positioned toward an outside of the pressurized cockpit and connected to one of the first and second sheets of glass by a further separating layer, said third sheet of glass having dimensions smaller than those of said first and second sheets of glass.

10. The window according to claim 8 including a silicone joint surrounding said peripheries of the first and second sheets of glass.

* * * * *